US005618337A

United States Patent [19]

Shinozaki et al.

[11] Patent Number: 5,618,337

[45] Date of Patent: Apr. 8, 1997

[54] THERMAL TRANSFER RECORDING MATERIAL AND THERMAL TRANSFER RECORDING METHOD USING SAME

[75] Inventors: Kenji Shinozaki; Hideki Hirano; Yukichi Murata; Mio Ishida, all of Kanagawa, Japan

[73] Assignees: Sony Corporation; Mitsubishi Chemical Corporation, both of Tokyo, Japan

[21] Appl. No.: 614,136

[22] Filed: Mar. 11, 1996

[30] Foreign Application Priority Data

Mar. 10, 1995 [JP] Japan ........ 7-079908

[51] Int. Cl.$^6$ ........ C09D 11/02

[52] U.S. Cl. ........ 106/22 H; 106/20 R

[58] Field of Search ........ 106/22 H, 22 A, 106/20 R

[56] References Cited

U.S. PATENT DOCUMENTS

| | | | |
|---|---|---|---|
| 3,390,168 | 6/1968 | Brack | 106/22 H |
| 3,555,016 | 1/1971 | Peter et al. | 106/22 H |
| 4,981,516 | 1/1991 | Kluger et al. | 106/22 H |
| 5,387,686 | 2/1995 | Ohyama et al. | 106/22 H |

*Primary Examiner*—Helene Klemanski
*Attorney, Agent, or Firm*—Hill, Steadman & Simpson

[57] ABSTRACT

A thermal transfer recording material for use in a recording apparatus in which the thermal transfer recording material is introduced into a transfer section having a porous structure by an effect of capillarity, subjected to a state transformation such as vaporization or droplet formation by heating, and then transferred to a recording medium disposed opposed to the transfer section, comprising:

a dye having a melting point of 115° C. or lower and represented by the general formula (I):

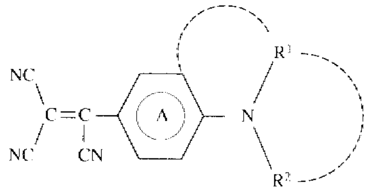

(I)

where A is a substituted or unsubstituted p-phenylene group, $R^1$ and $R^2$ are individually a hydrogen atom, a substituted or unsubstituted alkyl or alkenyl group, a cycloalkyl group or a substituted or unsubstituted phenyl group; and $R^1$ may constitute a heterocyclic group composed of a five- or six-member ring in combination with said p-phenylene group A and a nitrogen atom adjacent to the p-phenylene group A, or another heterocyclic group composed of a five- or six-member ring in combination with $R^2$ and the nitrogen atom adjacent to the p-phenylene group A.

14 Claims, 3 Drawing Sheets

THERMAL TRANSFER RECORDING MATERIAL AND THERMAL TRANSFER RECORDING METHOD USING SAME

BACKGROUND OF THE INVENTION

1. Field of the Invention

This invention relates to a thermal transfer recording material and a thermal transfer recording method using the recording material, and more particularly to a magenta dye-containing recording liquid material and a method of recording a full-colored image on a recording medium using the recording liquid material, in which the recording liquid material is splashed or vaporized from a recording (transfer) section of a recording apparatus toward the recording medium such as a printing paper by selectively heating the recording (transfer) section in response to information data.

2. Prior Art

In association with a recent progress of multi-colored image formation in the fields such as video cameras, computer graphics and the like, there is an increasing demand for coloring of hard copies. In order to fulfill the requirements for such a coloring of hard copies, a variety of proposals or attempts have been made, which include, for example, a sublimation-type thermal transfer recording system, a fusion-type thermal transfer recording system, an ink-jet printing system, an electrophotographic recording system, a thermal-development silver salt-type recording system or the like. Among them, the dye diffusion thermal transfer recording system (sublimation-type thermal transfer recording system) and the ink-jet printing system have been predominately utilized in view of facilitated operations with outputs of high quality image.

In the dye diffusion type thermal transfer recording system, there is used an ink ribbon or an ink sheet on which an ink layer composed of an adequate binder resin and a transfer dye dispersed in the binder resin at a high concentration, is coated. The ink ribbon or sheet is brought, under a constant pressure, into close contact with a recording medium such as a printing paper on which a dyable resin as a dye-acceptor for the transfer dye is coated. The ink ribbon or the ink sheet is then heated by a thermal print head in response to an image date entered so that the transfer dye is caused to be transferred to the recording medium in an amount corresponding to the heat supplied to the ink layer.

The aforementioned transfer operations are repeated with respect to separate image signals for three primary colors of subtractive process including yellow, magenta and cyan so that full-colored images with continuous tone gradation can be obtained. Attention has been paid to such a dye diffusion thermal transfer recording system as an excellent technique because of compactness of a recording apparatus used, ease of maintenance, prompt printing operation, a high quality image approximately identical to those of the silver salt color picture.

FIG. 1 schematically shows a front view of a printer used in such a thermal transfer recording system.

In the printer as shown in FIG. 1, a thermal print head 1 is disposed in an opposed relation to a platen roller 3. Interposed between the thermal print head 1 and the platen roller 3 is an ink sheet 12 composed of a base film 12*b* and an ink layer 12*a* coated over the base film 12*b*, and a recording paper (recording medium) 20 composed of a paper 20*b* and a dyable resin layer 20*a* coated on the paper. The ink sheet 12 and the recording paper 20 are pressed on the thermal print head 1 by the rotating platen roller 3.

The thermal print head 1 selectively heats the ink sheet 12 so that an ink (transfer dye) in the ink layer 12*a* is transferred in a dot pattern On the dyable resin layer 20*a* of the recording paper 20, whereby the thermal transfer recording operation is accomplished. The thermal transfer recording operation can be done in a serial printing mode in which the thermal print head 1 is scanned in a direction perpendicular to a traveling direction of the recording paper 20, or in a line printing system in which the thermal print head is fixedly arranged in a direction perpendicular to traveling direction of the recording paper 20.

However, these recording systems has posed serious problems such as a large amount of wastes or a high running cost due to disposable ink sheets, which prohibits the use of these recording systems in further wide application fields.

Thus, the conventional thermal transfer recording system has deficiencies such as need of exclusive recording papers and a high running cost due to the disposable ink ribbon or sheet though it gives a high-quality image.

Similarly, the thermal development silver salt-type recording system also has deficiencies such as need of exclusive recording papers and a high running cost due to the disposable ink ribbon or sheet and expansiveness of a recording apparatus used therefor though it also gives a high quality image.

On the other hand, in the ink-jet printing system, droplets of a recording liquid are splashed or ejected through a nozzle provided in a thermal print head toward a recording paper in response to a supply of image data by using an electrostatic absorbing system, a continuous oscillation system (piezo-system), a thermal system (bubble-jet system) or the like, as disclosed in U.S. Pat. No. 4,723,129, Japanese patent publication No. 5-217(1993) and so on.

Accordingly, the ink-jet recording system creates almost no wastes and therefore shows a low running cost as compared with the recording systems in which disposable ink ribbons or sheets are used. Recently, the thermal-type ink-jet printing system is predominately utilized because it can give full-colored image outputs in a facilitated operation.

However, in the ink-jet printing system, a concentration gradation of the image in each picture cell is difficult to achieve principally. Further, in the ink-jet printing system, it is impossible to reproduce such a high quality image approximately identical to a silver salt-type picture as obtained by the dye diffusions thermal transfer recording system, for a short period of time.

That is, in the ink-jet printing system, one droplet of the recording liquid produces one picture cell so that a concentration gradation in the picture cell is principally unachievable. This prohibits an image formation with a high quality. Although an attempt has been made to obtain a pseudo-concentration gradation by Dither method based on its high resolution, the ink-jet printing system cannot give a high quality image identical to those obtained by the sublimation-type thermal transfer recording system, and further shows a considerably low image transfer speed.

To the contrary, the electrophotographic recording system shows a low running cost and a high image transfer speed. However, the electrophotographic recording system requires expensive recording apparatus.

As described above, there exists no conventional recording system which fulfills all the requirements such as a high image quality, a low running cost, inexpensive recording apparatus, a short image transfer time and the like.

Recently, in order to overcome these problems encountered in the conventional recording systems, there has been proposed a novel recording method as is disclosed in European patent application No. 94101201.5. The method is called a non-contact type dye-ejection thermal transfer recording system in which a recording liquid is introduced into a transfer section having a porous structure due to a capillarity, heated by an adequate heating means such as a laser and formed into a vapor or a mist having a diameter not more than 1 μm. Such a vapor or mist is transferred through a gap off 10 μm to 300 μm on a recording paper disposed in an opposed relation to the transfer section.

In such a thermal transfer recording system, the porous structure causes an increase in surface area of the heater section (transfer section) and permits the recording liquid to be continuously fed to the heater section due to the capillarity and be retained therein. The heater section is then selectively applied with an appropriate quantity of heat corresponding to the image data by a heating means, for example, a laser beam, whereby a part of the recording liquid is vaporized to form an adequate amount of fine vapor particles or fine droplets in response to image data supplied in the from of an electrical signal from cameras or video cameras. The thus-produced fine vapor particles or fine droplets of the recording liquid can be transferred to the recording medium to form a printed image thereon.

Accordingly, in the thermal transfer recording system, the recording liquid can be converted into a, large number of relatively small droplets as compared with those obtained in the conventional ink-jet printing system. Further, the number of such small droplets produced can be freely controlled by a heat energy applied to the heater section based on the image data. This permits a multi-valued concentration gradation in the picture cell so that the image (full-colored image) having a quality identical to or higher than that of the silver salt-type recording system can be obtained on the recording paper.

The aforementioned recording system is of a thermal transfer type and therefore retains the previously mentioned features including compactness of a recording apparatus therefor, ease of maintenance, prompt printing operation, a high quality image, a high concentration gradation, or the like.

However, it has been confirmed that the thermal transfer recording system still has problems to be further improved irrespective of the aforementioned features.

That is, when the thermal transfer recording operation is repeated, burnt deposits such as decomposition products of dyestuffs or the like are generated at the transfer section of the recording apparatus so that a nozzle portion of the recording apparatus is clogged, namely a so-called kogation of the recording apparatus occurs, which results in fluctuation in splash or ejection characteristic of the recording liquid and therefore is likely to cause deterioration of a recording performance.

SUMMARY OF THE INVENTION

It is therefore an object of the present invention to provide a thermal transfer recording material capable of overcoming the aforementioned problems encountered in the prior art, especially kogation of the recording apparatus while maintaining the features of both a thermal transfer recording system and an ink-jet printing system, realizing an excellent resolution and concentration gradation in picture cells, and retaining the recording performance for a long period of time.

It is another object of the present invention to provide a thermal transfer recording method in which the aforementioned recording material is used.

As a result of intense studies and investigations made by the present inventors, it has been found that the aforementioned problems are caused by insufficient heat resistance of the dye used in the thermal transfer recording material, and therefore when the particular dye having a sufficient heat resistance is used, the deficiencies such as kogation of the recording apparatus is eliminated and a life time of a thermal print head can be considerably prolonged.

In one aspect of the present invention, there is provided a thermal transfer recording material for use in a recording apparatus in which the thermal transfer recording material is introduced into a transfer section having a porous structure by an effect of capillarity, subjected to state transformation such as vaporization or droplet formation by heating, and then transferred to a recording medium disposed opposed to the transfer section, comprising a magenta dye having a melting point of 115° C. or lower and represented by the general formula (I):

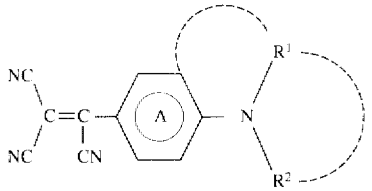

(I)

where A is a substituted or unsubstituted p-phenylene group, $R^1$ and $R^2$ are individually a hydrogen atom, a substituted or unsubstituted alkyl or alkenyl group, a cycloalkyl group or a substituted or unsubstituted phenyl group; and $R^1$ may constitute a heterocyclic group composed of a five- or six-member ring in combination with the p-phenylene group A and a nitrogen atom adjacent to the p-phenylene group A, or another heterocyclic group composed of a five- or six-member ring in combination with $R^2$ and the nitrogen atom adjacent to the p-phenylene group A.

In a second aspect of the present invention, there is provided a thermal transfer recording method used in operation of a recording apparatus including a transfer section composed of a plurality of fine porous column-shaped members, comprising the steps of:

introducing a thermal transfer recording material containing a dye having a melting point of 115° C. or lower and represented by the general formula (I):

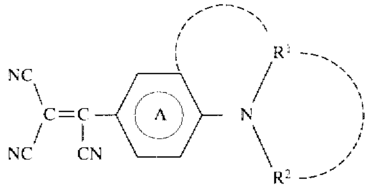

(I)

where A is a substituted or unsubstituted p-phenylene group, $R^1$ and $R^2$ are individually a hydrogen atom, a substituted or unsubstituted alkyl or alkenyl group, a cycloalkyl group or a substituted or unsubstituted phenyl group; and $R^1$ may constitute a heterocyclic group composed of a five- or six-member ring in combination with the p-phenylene group A and a nitrogen atom adjacent to the p-phenylene group A, or another heterocyclic group composed of a five- or six-member ring in combination with $R^2$ and the nitrogen atom adjacent to the p-phenylene group A, into the transfer section by an effect of capillarity;

subjecting the thermal transfer recording material to a state transformation by heating; and transferring the thermal transfer recording material to a recording medium disposed opposed to the transfer section.

These and other objects, features and advantages of the present invention will become more apparent from the following detailed description when read in conjunction with the accompanying drawings and the appended claims.

DETAILED DESCRIPTION OF THE INVENTION

Figure 1:
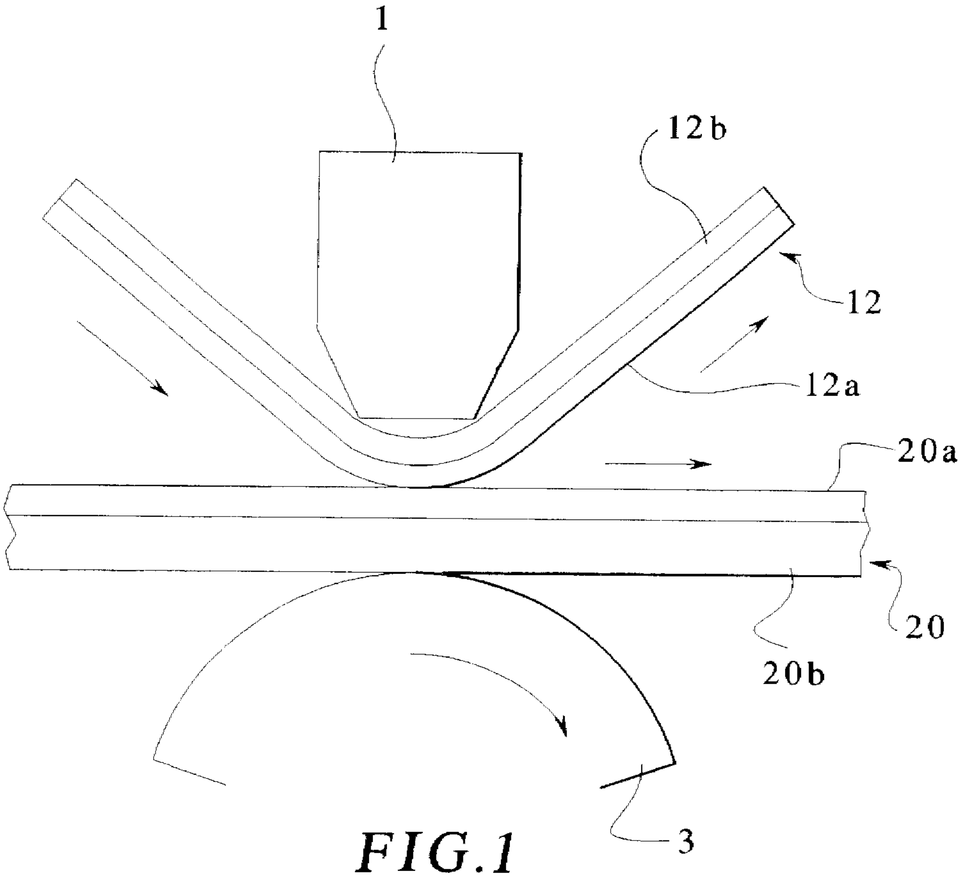
FIG.1 (PRIOR ART)
FIG. 1 is a front view Showing essential parts of a recording apparatus using a conventional thermal print head.

The thermal transfer recording material according to the present invention is introduced into a transfer section having a porous structure by a capillarity, subjected to a state transformation such as vaporization or droplet formation and then transferred to a recording medium disposed opposed to the transfer section. The thermal transfer recording material contains a dye (magenta dye) having a melting point of 115° C. or lower and represented by the general formula (I):

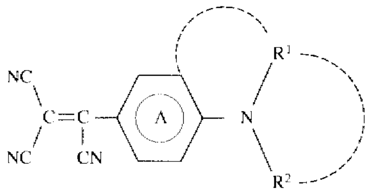

(I)

where A is a substituted or unsubstituted p-phenylene group, $R^1$ and $R^2$ are individually a hydrogen atom, a substituted or unsubstituted alkyl or alkenyl group, a cycloalkyl group or a substituted or unsubstituted phenyl group; and $R^1$ may constitute a heterocyclic group composed of a five- or six-member ring in combination with the p-phenylene group A and a nitrogen adjacent to the p-phenylene group A, or another heterocyclic group composed of a five- or six-member ring in combination with $R^2$ and the nitrogen atom adjacent to the p-phenylene group A. In the above, the dye-containing thermal transfer recording medium includes those in which a content of the dye is up to substantially 100%.

The p-phenylene group represented by A in the general formula (I) may have a substituent group(s). Examples of the substituent group of the p-phenylene group A may include a linear or branched alkyl group having 1 to 4 carbon atoms, a linear or branched alkoxy group having 1 to 4 carbon atoms, a halogen atom such as a fluorine atom, a chlorine atom or a bromine atom, a fluoroalkyl group having 1 to 4 carbon atoms, such as a trifluoromethyl group, or the like. The site of the p-phenylene group A, at which the substituent group(s) is bonded, is not particularly restricted. Further, the number of the substituent group(s) may be 1 to 4. The particularly preferred substituent is a methyl group.

The alkyl group represented by the radicals $R^1$ and $R^2$ in the general formula (I) may be a linear or branched alkyl group having 1 to 12 carbon atoms. Examples of the substituted alkyl groups may include hydroxyl-substituted alkyl groups such as 2-hydroxyethyl, 3-hydroxypropyl 4-hydroxybutyl or 2-hydroxypropyl, a cyanogen-substituted alkyl group such as 2-cyano-ethyl, an amino-substituted alkyl group such as 2-amino-substituted alkyl, a halogen-substituted alkyl group such as 2-chloroethyl, 3-chloropropyl, 2-chloropropyl or 2, 2, 2-trifluoroethyl, a phenyl-substituted alkyl group such as benzyl, p-chlorobenzyl or 2-phenylethyl, an alkoxy-substituted alkyl group such as 2-methoxyethyl, 2-ethoxyethyl, 2-(n)-propoxyethyl, 2-isopropoxyethyl, 2-(n)-butoxyethyl, 2-iso-buthoxyethyl, 2-(2-ethylhexyloxy)-ethyl, 3-methoxypropyl, 2-methoxypropyl, 4-methoxybuthyl or 3-methoxybutyl, 2,3-dimethoxypropyl, an alkoxy-alkoxy-substituted alkyl group such as 2-(2-methoxyethoxy)-ethyl, 2-(2-ethoxyethoxy)-ethyl, 2-(2-(n)-propoxyethoxy)-ethyl, 2-(2-(n)-butoxyethoxy)-ethyl or 2-{2-(2-ethylhexyloxy)ethoxy}-ethyl, a substituted alkyl group such as 2-allyloxyethyl, 2-phenoxyethyl or 2-benzyloxyethyl, an acyloxy-substituted alkyl group such as 2-acetyoxyethyl, 2-propionyloxyethyl or 2-trifluoroacetyloxyethyl, an alkoxycarbonyl-substituted alkyl group such as 2-methoxycarbonylethyl or 2-ethoxycarbonylethyl, a heterocyclic group-substituted alkyl group such as furfuryl or tetrahydrofurfuryl, or the like.

The unsubstituted alkyl group as the radicals $R^1$ and $R^2$ may be a linear or branched alkyl group having no substituent. When the radicals $R^1$ and $R^2$ are an alkenyl group, examples thereof may include those having the same number of carbon atoms as the aforementioned alkyl group but at least one double bond.

The preferred substituted phenyl groups represented by the radicals $R^1$ and $R^2$ may be phenyl groups having a substituent group such as a linear or branched alkyl group having 1 to 8 carbon atoms, a linear or branched alkoxy group having 1 to 4 carbon atoms, a fluorine atom, a chlorine atom, a bromine atom, or a fluoroalkyl group having 1 to 4 carbon atoms such as trifluoromethyl.

The preferred cycloalkyl group represented by the radicals $R^1$ and $R^2$ may be cyclopntyl, cyclohexyl, or the like.

The particularly preferred radicals $R^1$ and $R^2$ may include a linear or branched alkyl group having 1 to 8 carbon atoms; a linear or branched alkyl or alkenyl group with 1 to 4 carbon atoms having a substituent group such as a linear or branched alkoxy group having 1 to 4 carbon atoms, a phenyl group, a phenoxy group or an allyloxy group; a heterocyclic group-substituted alkyl group (the heterocyclic group may include, for example, tetrahydrofurfuryl); an alkenyl group with 2 to 8 carbon atoms having a substituent group such as allyl, or the like.

The radical $R^1$ may constitute a heterocyclic group in combination with the phenylene group A and the nitrogen atom adjacent to the phenylene group A. The dye having such a heterocyclic group may be compounds represented by the general formulae (II) and (III):

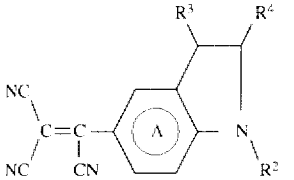

(II)

where A and $R^2$ have the same meaning as defined in the general formula (I), and the radicals $R^3$ and $R^4$ are individually a hydrogen atom or an alkyl group; and

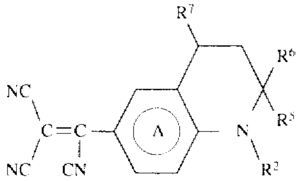

(III)

where A and $R^2$ have the same meaning as defined in the general formula (I), and the radicals $R^5$, $R^6$ and $R^7$ are individually a hydrogen atom or an alkyl group.

The heterocyclic group, which is constituted by the radicals $R^1$ in combination with $R^2$ and the nitrogen atom adjacent the phenylene group A, may include:

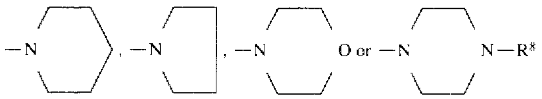

where $R^8$ is an alkyl group.

Specific examples of the magenta dye represented by the general formula (I) are those enumerated in Tables 1A, 1B and 1C.

TABLE 1A

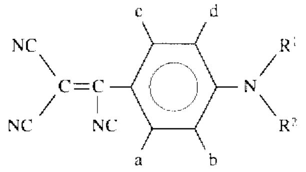

| No. | a | b | c | d | $R^1$ | $R^2$ |
|---|---|---|---|---|---|---|
| 1 | H | H | H | H | $-C_2H_5$ | $-CH_2CHCH_2OCH_3$<br>\|<br>$OCH_3$ |
| 2 | H | H | H | H | $-C_6H_{13}$ (n) | 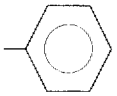 |
| 3 | H | H | H | H | $-CH_3$ | $-(CH_2)_2COOCH(C_2H_5)_2$ |
| 4 | H | H | H | H | $-C_4H_9$ (n) | 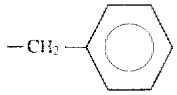 |
| 5 | H | H | H | H | $-C_4H_9$ (n) | $-CH_2-CH=CH_2$ |
| 6 | H | H | H | H | $-C_4H_9$ (n) | $-CH_2CH_2OH$ |
| 7 | H | H | H | H | $-C_4H_9$ (n) | $-CH_2CH_2OCH_3$ |
| 8 | H | H | H | H | $-C_4H_9$ (n) | $-CH_2CH_2OCH_2CH_2OCH_3$ |
| 9 | H | H | H | H | $-C_4H_9$ (n) | $-C_2H_5$ |
| 10 | H | H | H | H | $-C_6H_{13}$ (n) | 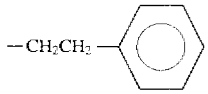 |
| 11 | H | H | H | H | $-CH_2CHC_4H_9$(n)<br>\|<br>$C_2H_5$ | $-CH_2CH_2CN$ |
| 12 | H | H | H | H | $-CH_2CHC_4H_9$(n)<br>\|<br>$C_2H_5$ | $-CH_2CH_2Cl$ |
| 13 | H | H | H | H | $-C_6H_{13}$ (n) | 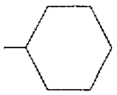 |

TABLE 1A-continued

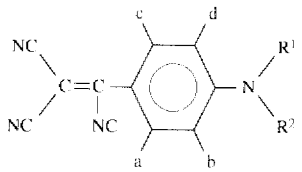

| No. | a | b | c | d | $R^1$ | $R^2$ |
|---|---|---|---|---|---|---|
| 14 | H | H | H | H | $-C_6H_{13}$ (n) | 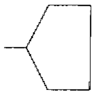 |
| 15 | H | H | H | H | $-C_6H_{13}$ (n) | $-CH_2CH_2NH_2$ |
| 16 | H | H | H | H | $-C_6H_{13}$ (n) | $-CH_2CH_2O-$ 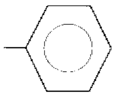 |
| 17 | H | H | H | H | $-C_6H_{13}$ (n) | $-CH_2CH_2OCH_2-CH=CH_2$ |
| 18 | H | H | H | H | $-C_6H_{13}$ (n) | 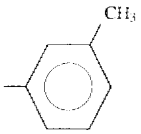 |

TABLE 1B

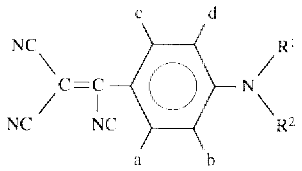

| No. | a | b | c | d | $R^1$ | $R^2$ |
|---|---|---|---|---|---|---|
| 19 | H | H | H | H | $-C_6H_{13}$ (n) | $-CH_2-$ 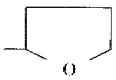 |
| 20 | H | H | H | H | $CH_3$<br>\|<br>$-CH_2CH_2CHOCH_3$ | $CH_3$<br>\|<br>$-CH_2CH_2CHOCH_3$ |
| 21 | H | H | H | H | $-C_4H_9$ (n) | $-C_2H_5$ |
| 22 | H | H | H | H | $-C_4H_9$ (i) | $-CH_2CHCH_2OCH_3$<br>\|<br>$OCH_3$ |
| 23 | H | H | H | H | $-C_4H_9$ (i) | $-CH_2CH_2OCOCH_3$ |
| 24 | H | H | H | H | $-C_4H_9$ (i) | $-CH_2CH_2OC_4H_9$ (n) |
| 25 | $-OCH_3$ | H | H | H | $-C_4H_9$ (n) | $-C_2H_5$ |
| 26 | H | $-CH_3$ | H | H | $-H$ | $-CH_2CHC_4H_9$ (n)<br>\|<br>$C_2H_5$ |
| 27 | $-CH_3$ | H | H | H | 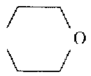 | |
| 28 | H | H | H | H | 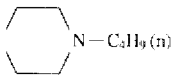 | |

TABLE 1B-continued
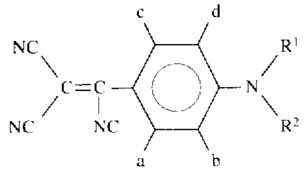
| No. | a | b | c | d | $R^1$ | $R^2$ |
|---|---|---|---|---|---|---|
| 29 | $-CH_3$ | H | H | H | 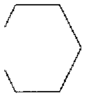 | |
| 30 | $-CH_3$ | H | H | H | 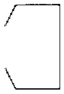 | |
TABLE 1C
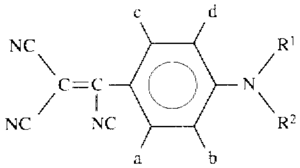
| No. | a | b | c | d | $R^1$ | $R^2$ |
|---|---|---|---|---|---|---|
| 31 | 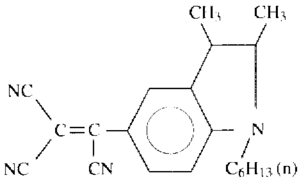 | | | | | |
| 32 | 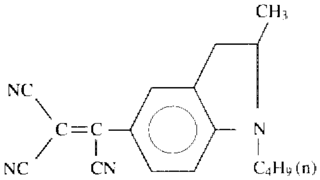 | | | | | |
| 33 | 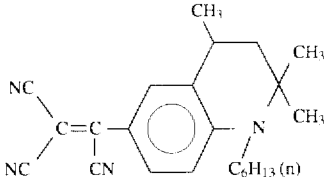 | | | | | |
| 34 | 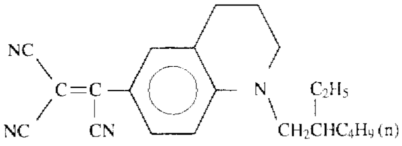 | | | | | |
| 35 | 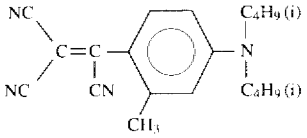 | | | | | |
| 36 | 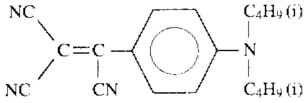 | | | | | |
| 37 | 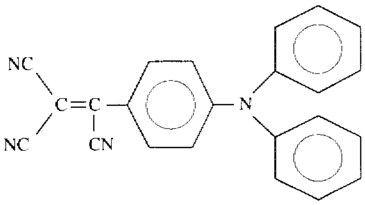 | | | | | |
Note: The dyes Nos. 31 to 37 are represented by their structural formulae.

Concretely, the thermal transfer recording material according to the present invention is converted into vapor or mist having a diameter not more than 1 μm in a transfer section of a recording apparatus. The thus-produced vapor or mist is transferred through a gap of 10 μm to 300 μm onto a recording medium disposed in an opposed relation to the transfer section. Such a non-contact arrangement in which the transfer section is opposed through the gap to the recording medium, provides both a high quality image and a prompt printing operation, achieves compactness and light weight of the recording apparatus and enables the transfer of the dye to a plain paper without generation of wastes, whereby a low consumption of electric power and a low running cost can be realized.

The porous structure of the transfer section of the recording apparatus permits the thermal transfer recording material to be fed thereinto and retained therein by an effect of capillarity. Particularly, it is preferred that the porous structure has a side length or diameter of 0.2 to 3 μm and a height of 1 to 15 μm.

In this case, the porous structure may be composed of a plurality of fine column-shaded members each having a side length or diameter of 0.5 μm to 3 μm and a height of 1 μm to 15 μm. At least three column-shaped members may be arranged spaced at a distance of 0.5 μm to 3 μm apart from each other in each of the longitudinal (row) and lateral (column) directions.

By the provision of such a porous structure, for instance, an irregular structure composed of a plurality of column-shaped members, the following three remarkable effects are obtained.

That is, a first effect is resides in that a large surface area due to the aforementioned irregular structure is achieved so that the thermal transfer recording liquid can be spontaneously fed into the recording portion by an effect of capillarity.

A second effect resides in the following point. That is, a surface tension of a liquid is generally decreased as a temperature thereof increased. As a result, when the recording liquid is heated, a heated center of the recording liquid has a low surface tension as compared with the surrounding portion thereof so that the center portion is forced outwardly. At this time, the center portion of the recording liquid is prohibited from moving outwardly due to existence of the irregular structure, whereby deterioration of transfer sensitivity can be effectively prevented.

A third effect resides in that recessed portions of the irregular structure of the recording (transfer) section function as a vaporizaion nozzle for the finely divided recording liquid. As a result, an extremely large number of droplets composed of the finely divided recording liquid, can be splashed or vaporized through a space toward-the recording medium such as a printing paper disposed in an opposed relation to the recording section. By using this principal, it is possible to obtain a concentration gradation in the picture cell which cannot be achieved in the conventional ink-jet printing system.

That is, the provision of such a porous structure (irregular structure) on the heater section (recording section or transfer section) permits an increase in surface area thereof so that the recording liquid is continuously fed to the heater section by an effect of capillarity and retained therein. In this condition, when the heater section is selectively supplied with a quantity of heat in response to information data by a heating means such as a laser beam, a part of the recording liquid is evaporated and thereby causes a pressure rise. Successively, the heated recording liquid is converted into fine droplets whose volume is determined by the quantity of heat corresponding to information data applied in the form of electrical signals from a color-video camera. The thus-produced fine droplets are then transferred to the recording medium so that a desired image is formed on the recording medium.

In this case, a larger number of fine droplets can be formed at the aforementioned transfer section as compared with the conventional ink-jet printing system. Such fine droplets can be freely controlled in number thereof based on the-information data applied to the heater section for heating the recording liquid. This enables a multi-valued concentration gradation in the picture cell so that there can be obtained an image, for example, a full-colored image having a quality identical to or higher than that in the silver salt recording system.

Accordingly, in the thermal transfer recording system according to the present invention,there is used a thermal print head having a special structure capable of thermally transferring the recording liquid in the form of extremely fine droplets on demand so that an excellent ink-jet printing system can be provided, in which 128 or more concentration gradations in a picture cell can be expressed per at least one color.

Such a porous structure can be formed by using various methods. Such methods may include a method in which porous alumina layers each having an average pore size of 0.1 μm to 2 μm are arranged into a laminate having a thickness of 5 μm to 20 μm, a method in which glass beads having an average particle size of 0.5 μm to 3 μm are arranged into a laminate having 5 μm to 20 μm, a method in which a large number of silicon whiskers each having an average diameter of 0.5 μm to 2 μm and an average height of 2 μm to 10 μm are grown on a substrate at intervals of 1 μm to 3 m, or the like methods.

It is preferred that the porous structure is formed from a plurality of fine column-shaped members made of glass or silicon and each having a side length or diameter of 0.5 μm to 3 μm and a height of 1 μm to 15 μm . These fine column-shaped members are produced by semiconductor manufacturing techniques such as a reactive ion etching method, a powder beam etching method or the like, to perform an accurate control of, particularly, an amount of the recording liquid transferred. In this case, three or more fine column-shaped members are regularly arranged spaced at a distance of 0.5 μm to 3 μm apart from each other in each of the longitudinal (row) and lateral (column) directions.

In addition, it is preferred that the porous structure exhibits a heat resistance to a temperature of 300° C. or higher and the heater (transfer) section at which the fine droplets are formed, is disposed spaced by a gap of 10 μm to 300 μm from the recording medium. The fine droplets are splashed or vaporized from the heater section to the recording medium through the gap.

Although such a porous structure exhibits the aforementioned excellent advantages, when the recording operation is performed, particularly when it is repeated, there is a tendency that the porous structure is likely to suffer from a clogging due to adhesion of deteriorated materials such as decomposition products upon heating, whereby malfunctions of the print head occurs.

However, in accordance with the present invention, the thermal transfer recording material has a much enough heat resistance so that any kogation due to deposition of the decomposition products is not generated. As a result, even when the recording operation is repeated the porous structure is still maintained and can function effectively.

This is assured by limiting a melting point of the magenta dye represented by the general formula (I) to such a low level as 115° C. or lower, preferably 100° C. or lower, whereby condensation of the recording material is effectively prevented. A lower limit of the melting point may be 0° C., preferably 25° C. to prevent sticking of the recording material. In addition, the melting point of the magenta dye can be adjusted by adequately selecting the radicals $R^1$ and $R^2$ of the aforementioned general formula (I).

When used in the ink jet printing system, it is preferred that the thermal transfer recording material be composed of a magenta dye which contains 90% by weight or more of a vaporizable component and 10% by weight or less of a residue when heated to a temperature of 300° C. or higher, and a solvent (non-aqueous solvent except water) which has a boiling point of 150° C. or higher and can dissolve or disperse therein 5% by weight or more of the dye at 50° C. or lower.

As described above, the solvent is preferably capable of dissolving or dispersing therein the aforementioned dye, and at the same time has a boiling point of 150° C. or higher. This is because the aforementioned porous structure has a large surface area so that the solvent having a boiling point of 150° C. or higher has to be used to prevent vaporization or evaporation of the solvent and drying of the transfer section. By using such a solvent, whereby deterioration of a recording performance due to fluctuation in concentration of the recording liquid can be prevented effectively.

Particularly, the preferred solvent may be a colorless solvent having a melting point of 50° C. or lower and a boiling point ranging from 150° C. to 400° C. When the melting point of the solvent exceeds 50° C., the recording liquid composed of a mixture of the dye and the solvent is likely to be condensed in the non-printing temperature range from room temperature to 50° C. since the dye generally has a melting point of 100° C. or higher. On the other hand, the boiling point of the solvent is lower than 150° C., only the solvent is likely to be evaporated from the recording liquid because the transfer section is exposed to atmosphere. Moreover, when the boiling point of the solvent exceeds 400° C., an efficiency of vaporization of the solvent is deteriorated whereby a transfer sensitivity of the recording system is apt to be decreased.

It is preferred that a molecular weight of the solvent is 450 or lower. When the molecular weight of the solvent is too high, the expansion coefficient becomes low upon vaporization of the solvent so that the transfer sensitivity is also likely to be decreased. It is further preferred that the solvent contains 0.01% by weight or less of residue when it is heated to 200° C. in air.

From a standpoint of the transfer to a plain paper, the solvent exhibits an spontaneous absorption to fibrous material such as a plain paper copy (PPC), an art paper or the like.

In order to dissolve 5% by weight or more, particularly 10% by weight or more of the dye into the solvent at a temperature of 50° C. or lower, it is preferred that the solvent has a solubility parameter (prescribed by J. H. Hildebrand) of 7.5 to 10.5 at 25° C. It is further preferred that the solvent is colorless, and has a flash point of 150° C. or higher and no toxicity to a human body. When the solubility parameter of the solvent exceeds 10.5, a solubility of the dye is lowered and the recording liquid absorbs a moisture in air whereby the transfer sensitivity and reproductivity of the recording system are deteriorated. On the other hand, when the solubility parameter is less than 7.5, the solubility or, the dye is also likely to be decreased.

Specific example of the solvent may be an aromatic ester which may include dialkyl phthalate such as dimethyl phthalate, diethyl phthalate, dibutyl phthalate, di-iso-butyl phthalate or dioctyl phthalate. Moreover, desirable solvents may be aromatic hydrocarbons including n-alkyl benzene, n-alkyl naphthalene, n-dialkyl benzene, n-dialkyl naphthalene, or the like. These compounds may have an alkylchain having 2 to 30 carbon atoms. The alkyl substituents of the aromatic hydrocarbons may include ethyl, iso-propyl, dodecyl, or the like. In the case of n-alkyl benzene, the alkyl substituent may nave 10 to 15 carbon atoms. Such n-alkyl benzene may include dodecyl benzene.

In the conventional ink-jet printing method, an acid dye is generally used. Such a acid dye is oozed or flowed on the recording paper due to its hydrophilic property when attached thereto. In consequence, the acid dye has a low water resistance and is difficult to be color-developed. Further, when such an acid dye is used, there is tendency to cause kogation due to a self-decomposition in case a heat is supplied thereto upon recording. On the other hand, the aforementioned magenta dye according to the present invention does not cause such deficiencies and therefore well attached to the recording paper and color-developed. Further, the magenta dye is unlikely to cause a kogation due to the decomposition products.

Moreover, when the magenta dye is used in combination with, particularly, a phthalic acid-dialkyl ester, attachment of the magenta dye onto the recording paper is further improved because the solvent is well soaked into the recording paper. Further, the solvent also functions as a color-developing assistant. In consequence, when the recording liquid composed of the magenta dye and the solvent is used, the transfer of the dye to the plain paper copy (PPC) is possible and a high quality image can be formed. Conventionally, a concentration of the dye in the recording liquid has been set to at most 5% by weight. On the other hand, the recording liquid composed of the combined magenta dye and the solvent according to the present invention has a wide solvent content ranging from 50 to 98% by weight so that the dye concentration is enhanced to 10% by weight or higher whereby an image concentration can be improved.

The recording liquid can be used in a thermal print head which is constituted by a recording (transfer) section with a heating means, an ink storage tank for storing the recording liquid and a liquid passage communicating between the recording section and the ink tank. Such a thermal print head can be heated as a whole to 50° C. to adjust a viscosity coefficient of the recording liquid to a proper level. In order to shorten a transfer time, two or more recording sections can be provided on one thermal print head. The recording liquid is continuously fed to the recording section through the liquid passage to compensate a quantity of the recording liquid consumed at the recording section.

The heating means for heating the recording section may include a heating member such as a resistance heater, a combination of a laser for changing its output depending upon the information data applied and a laser beam-absorbing material (light/heat transformer) provided at the recording section, or the like. In the case of the laser, a semiconductor laser is preferable because it has a high controllability and can constitute a compact and light-weight print head. The resistance heater can be prepared by attaching a conductive material such as polysilicon directly onto the recording section.

The recording paper usable for the transfer of the recording liquid according to the present invention may include a plain paper such as PPC, a high quality paper such as an art paper or the like. Particularly, an exclusive printing paper prepared by coating polyester, polycarbonate, acetate, an epoxy resin or polyvinyl chloride on a base film can be usefully employed to obtain an image having a high concentration, an excellent gradation and a high quality. In order to assure a storage stability of the obtained image, it is effective to laminate a resin film on the recording paper having the image, after transferring operation.

In order to obtain a multi-color image (particularly full-colored image), one recording liquid containing one color dye in the three primary colors of a subtractive process and another recording liquid containing at least one of the other color dyes in the three primary colors of a subtractive process are selectively heated. The heating operation is repeated, for example, by respective image signals indicative of yellow, magenta and cyan, whereby the desired full-colored image can be obtained.

The preferred embodiments of the present invention are described in detail below.

Referring to FIGS. 2 to 5, there is shown a non-contact-type thermal printer (for example, video printer) to which the thermal transfer recording material and method according to the present invention are applied.

Figure 2:
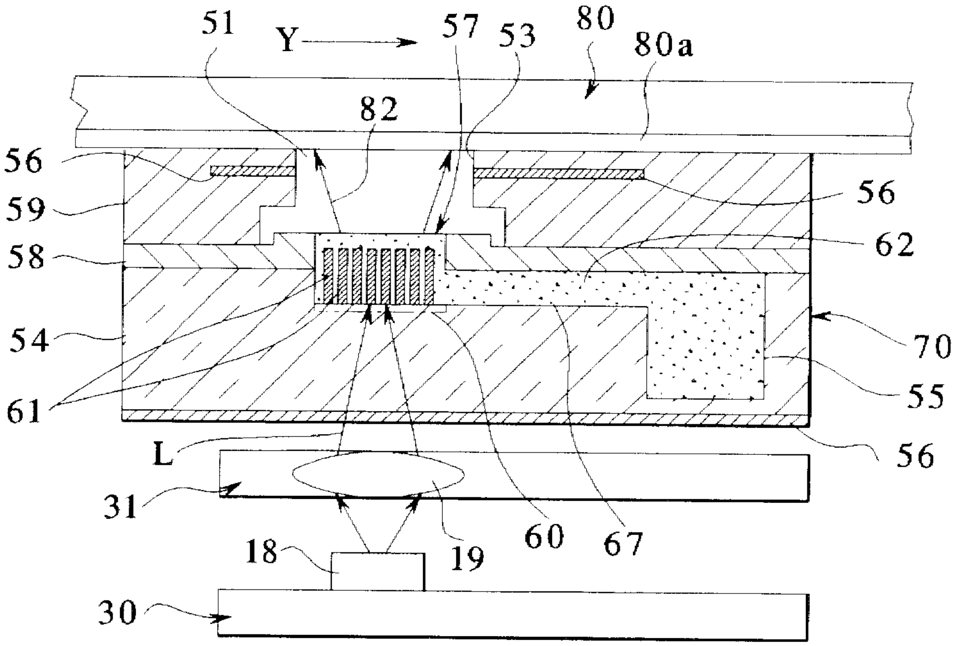
FIG. 2 is a sectional view of a thermal print head according to a first embodiment of the present invention.
Figure 3:
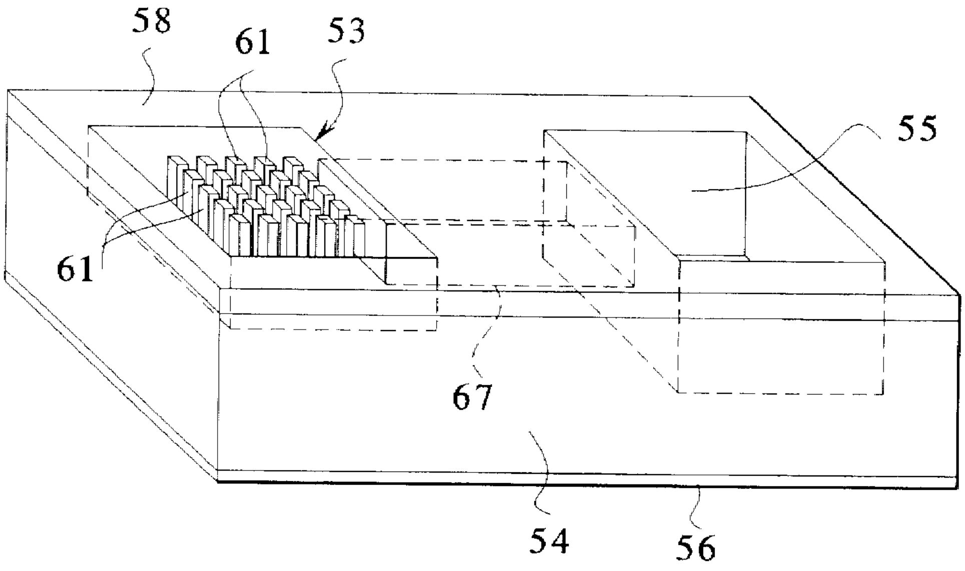
FIG. 3 is a perspective view showing essential parts of the thermal print head according to the first embodiment of the present invention.

In the thermal transfer recording system according to the present invention, as is shown in FIG. 2, the thermal print head 70 is adapted to be heated by a laser beam. In this case, a light-absorbing material (light/heat transformer) may be provided at a vaporizing (transfer) section 57 to enhance an absorbance of the laser beam. A recording liquid 62 composed of the hot melt-type magenta dye of the general formula (I), if required a mixture of the magenta dye and a carrier (solvent), is stored on the vaporizing section 57. A fine gap 51 is formed between the vaporizing section and a recording paper 80 opposed to the vaporizing section.

By using an adequate heating means such as a laser L, a portion of the liquid dye (recording liquid) 62 in the recording portion (vaporizing section 57) is selectively heated so that the heated portion of the recording liquid is converted into fine droplets which is then splashed or vaporized through the fine gap 51 toward the recording paper 80 to form an image having a continuous gradation thereon. This operation is repeated based on respective image signals for yellow, magenta and cyan of the three primary colors of a subtractive process so that a full-colored image can be obtained on the recording paper.

The fine gap 51 is preferably in the range of 10 μm to 300 μm, particularly preferably 50 μm to 200 μm. When the gap 51 is less than 10 μm, the thermal print head 70 is likely to come into contact with the recording paper during movement thereof whereby a stability of the image transfer is apt to be deteriorated. On the other hand, when the gap 51 is more than 300 μm, the fine droplets cannot reach the recording paper in an effective manner so that a sensitivity of the image transfer and a resolution of the image is apt to be deteriorated.

In the thermal transfer recording system according to the present invention, the recording paper 80 is disposed, for example, above the thermal print head 70 in an opposed manner. The laser beam L emitted from a laser 18 is condensed through a lens 19 and irradiated on a portion in proximity of an upper surface of the vaporizing section 57, whereby the fine droplets 82 of the recording liquid can be splashed or vaporized upwardly.

In addition, a dye storage cavity 55 can be provided in a laser beam-permeable head base 54. The recording liquid 62 is stored in a space between a bottom surface of the dye storage cavity 55 and a spacer 58 fixed on the head base 54 and continuously fed from the space to the vaporizing section 57 through the liquid passage 67. In this case, in order to improve a feed efficiency and an evaporation efficiency of the recording liquid 62, fine irregularities constituted by a plurality of fine column-shaped members 61 is provided at the vaporizing section 57. Such fine column-shaped members 61 serves for feeding and retaining the recording liquid 62 by an effect of capillarity. The fine column-shaped members can be prepared by using a reactive ion etching method (RIE) or lithographic techniques.

These fine column-shaped members exhibits a heat resistance to an elevated temperature of 300° C. or higher, and has a height of 1 μm to 15 μm, preferably 2 μm to 10 μm and a diameter or side length (t) of 0.2 μm to 3 μm, preferably 0.5 μm to 3 μm. A distance d between the adjacent column-shaped members is in the range of 0.2 μm to 3 μm, preferably 0.5 μm to 3 μm. The column-shaped members have a circular or rectangular shape in section. It is preferred that at least three column-shaped members are regularly arranged in juxtaposed relation in each of longitudinal (row) and lateral (column) directions. (see FIGS. 3 and 4)

The column-shaped-member structure causes the recording liquid to be spontaneously introduced into the heater section (transfer section or vaporizing section) due to an effect of capillarity based on its large surface area. In such a column-shaped member structure, even though the center portion of the transfer section is locally heated upon the transfer operation, it is prevented to cause an undesired phenomenon that the recording liquid is caused to move to a non-heated portion of the transfer section due to its temperature dependency (escape phenomenon).

In this case, when the height of each column-shaped member is less than 1 μm, it is difficult to prevent the escape phenomenon of the recording liquid upon the transfer operation. On the other hand, when the height of the column-shaped member exceeds 15 μm, a quantity of the recording liquid retained therein is too large so that it becomes difficult to effectively heat the recording liquid 62. When the column-shaped member 61 has a diameter or side length less than 0.2 μm, it is likely to be broken by a wave motion of the recording liquid which generates upon heating. On the other hand, when the diameter or side length of the column-shaped member exceeds 3 μm, an occupied volume of the recording liquid becomes too small so that the transfer sensitivity is apt to be lowered. When the distance between the adjacent column-shaped members is less than 0.2 μm, the occupied volume of the recording liquid becomes too small so that the transfer sensitivity is also apt to be lowered. On the other hand, when the distance exceeds 3 μm, it is difficult to prevent occurrence of the escape phenomenon upon the transfer operation.

Figure 4:
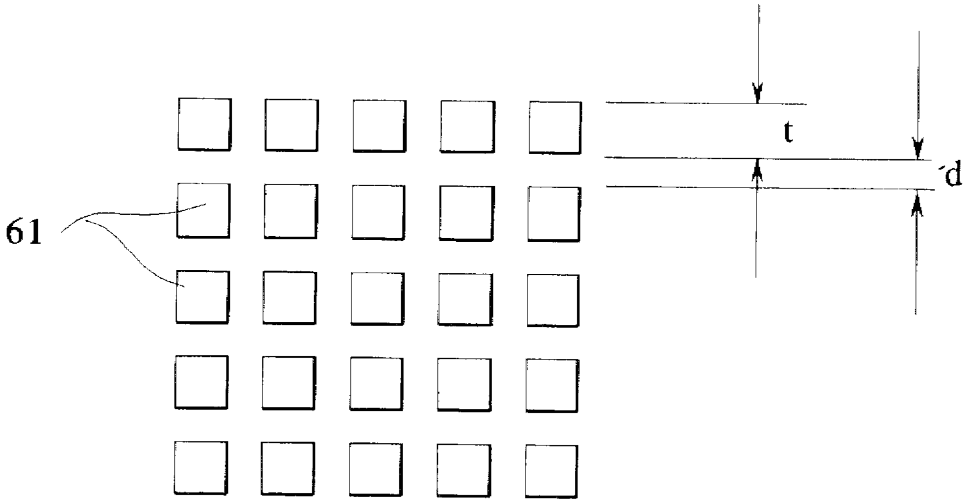
FIG. 4 is a plan view showing a pattern of a group of fine column-shaped members provided at a transfer section (vaporization section) of the thermal print head according to the first embodiment of the present invention.

A shape of a top plan surface of the column-shaped member may be a square as shown in FIG. 4, or the other adequate shape. Further, the column-shaped members may be arranged in a matrix composed of 2 to 100 rows in the longitudinal direction and 2 to 100 columns in the lateral direction.

On the spacer 58 of the thermal print head, there is provided a protective plate 59 which defines the gap 51 and serves as a guide for traveling the recording paper 80 in the direction indicated by X in FIG. 2. The protective plate 59 may be provided therein with a heater element 56, as indicated by a phantom line in FIG. 2, for retaining a liquid state of the recording liquid. Alternatively, as indicated by a solid line in FIG. 2, the heater element 56 may be fixed on an outer surface of the head base 54 defining the dye storage portion. Further, the heater element 56 can be provided in the liquid-passage 67 or the dye storage cavity 55.

In the thermal print head of the present invention, the head base 54 may be made of an inorganic material having a high heat resistance, such as glass, metal, silicon, ceramic or the like, or an organic polymer having a heat resistance to an elevated temperature of 300° C. or higher, such as polyimide, aramide or the like. The thermal print head can be provided with an adequate thermal insulating device to permit a recording liquid having a melting point higher than room temperature to be used therein.

The liquid passage 67 serves for feeding the recording liquid from the ink tank 55 to the transfer section 57. The liquid passage 67 may have a sectional surface area of 50 $\mu m^2$ or larger to permit a rapid supply of the recording liquid 62 having a viscosity coefficient of 10 cps or lower at 150° C. or lower to the transfer section, whereby deterioration of the transfer sensitivity does not occur during the transfer operation.

Dyes usable in the recording liquid according to the present invention may include those represented by the aforementioned general formula (I). Such a dye may be used singly or in the form of a mixture of two or more different compounds.

The recording liquid is partially heated and vaporized to form fine droplets containing an amount of the dye in response to information data entered. The thus-produced droplets are splashed or vaporized through the gap 51 to transfer it on the recording paper 80. In the case of the ink-jet printing system, a volume of the recording liquid is expanded 50 or higher times that of the original liquid volume upon vaporization thereof. It is preferred that the aforementioned recording liquid is prepared by dispersing the dye in the solvent (carrier) having a melting point of 50° C. or lower and a boiling point of 150° C. or higher, preferably in the range of 250° to 400° C. at one atm. Especially, the preferred solvent is dialkyl phthalate.

The recording medium (recording paper) suitably used in the preferred embodiment of the present invention, may be a printing paper 80 having a dye-acceptor layer 80*a*. Any printing paper can be used in the present invention as far as it has an adequate compatibility to the transferred dye and the transferred dye is easily accepted thereon such that an inherent color development and fixing thereof is promoted.

The heating means usable in the present invention typically includes three types, namely a first type is a thermal head, a second type is a laser beam, and a third type is a combination of the laser beam and a material having an absorbency to a laser beam or a light having a similar wave length to the laser beam and capable of converting a light energy to a thermal energy (light/heat transformer).

In the case of the laser beam, a resolution of the transferred image is considerably improved. Further, since a density of the laser beam can be increased by using an optical system, a heating of the thermal print head can be performed in a concentrated manner so that the temperature of the thermal print head is considerably elevated whereby a thermal coefficient of the recording system is improved.

Particularly, by using a semiconductor multi-laser having a structure in which several to several hundred semiconductor-laser elements are arranged in line, the transfer time per one print image is considerably shortened. However, since the laser beam is continuously irradiated, the light/heat transformer as indicated by a dotted line 60 in FIG. 2 must have a sufficient heat resistance.

Accordingly, such a light/heat transformer 60 suitably used in the present invention may include a metal film having an absorbency to an emission wave length of the laser beam, or a two-layer thin absorber composed of a metal film and a ceramic film having a high dielectric constant. The light/heat transformer 60 can be directly fixed on the transfer section as shown in FIG. 2. Alternatively, a particulate absorber composed of fine particles such as carbon black, metal powder can be uniformly dispersed in the recording liquid (transfer dye).

Moreover, an entire body of the thermal print head is so constituted that respective dye storage cavity 55 for cyan, magenta and yellow colors can be provided in a common head base 54 and communicate with separate print heads 70C, 70M and 70Y to introduce respective recording liquids into the vaporizing sections each composed of a plurality of dots arranged in 12 to 24 rows.

At a position opposed to each vaporizing section, there are provided multi-laser arrays 30 composed of lasers 18 (particularly semiconductor laser chips), for example, twenty-four (24) laser elements are arranged into an array. The laser beam emitted from each multi-laser array 30 is condensed through a micro-lens array 31 composed of a plurality of condensing lens 19.

In the case of mono-color printing, it is sufficient to provide a single head portion and a corresponding one dimensional laser array.

The print head 70 is equipped with the dye accommodating portion in which the recording liquid 62 is received in a dot pattern corresponding to the number of recording dots. The laser elements 18 are also arranged in the form of an array having a dot pattern corresponding to the recording dots.

The printer equipped with the printer head 70 may operate, for example, in a serial-type printing mode in which the recording paper is fed in the longitudinal direction (X direction) and the printer head 70 is scanned in the lateral direction (Y direction perpendicular to X direction). The feeding of the recording paper in the longitudinal direction and the scanning off the printer head in the lateral direction may be carried out in an alternate manner.

Figure 5:
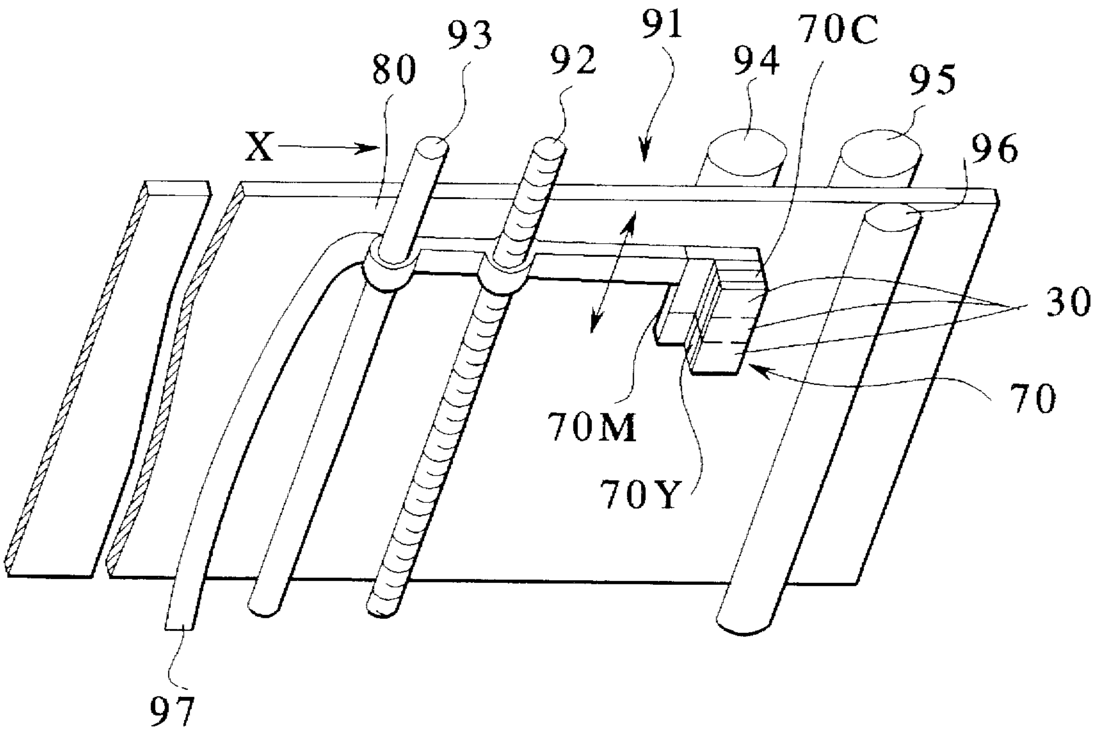
FIG. 5 is a perspective view schematically showing a printer as viewed from a lower side thereof.

As shown in FIG. 5, the printer 91 includes, for example, a multi-color print head 70. The print head 70 is caused to reciprocatively move in the Y direction perpendicular to the X direction (feed direction of the recording paper) by means of a head feed shaft 92 and a head support shaft 93 both constituted by a feed screw mechanism.

Disposed above the print head 70 is a rotatable head receiving roller 94 for supporting the recording paper 80 in a sandwiched manner. The recording paper 80 is then interposed between a drive roller 95 and a driven roller 96 to be delivered in the X direction.

Incidentally, the print head 70 is electrically connected through a flexible harness 97 to a head drive circuit board (not shown) or the like.

As described above, in accordance with the present invention, the vaporizing (transfer) section for the recording liquid is constituted by a group of fine column-shaped members 61. This makes it possible to provide a non-contact-type dye transfer printer. Such a non-contact-type printer has both the features of the thermal transfer-type recording system and the ink-jet printing system, so that an amount of wastes and the transfer energy can be considerably reduced. Further, the recording system of the present invention can realize compactness and weight reduction of the printer and provide a high resolution and an excellent gradation in each dot whereby a recording performance of the printer can be maintained for a long period of time without occurrence of the kogation.

EXAMPLES

In the following, the present invention is described in more detail by way of examples and comparative examples.

Example 1

A recording liquid composed of the dye No. 1 of Table 1A having a melting point of 69° C. to 70° C. was filled into a thermal transfer print head, as shown in FIG. 2, which was provided with a transfer section having a size of 50 μm and fine column-shaped members having a diameter of 2 μm while an entire part of the head was heated to 100° C. The thermal transfer print head was mounted to a printer as shown in FIG. 5, which had a single head segment for a mono-color tone. Further, an exclusive recording paper for a sublimation-type thermal transfer printing system (VPM30STA manufactured by Sony Corp.) as a recording medium was set on the printer. At this time, a distance between the recording paper and the transfer print head was adjusted to 50 μm.

Next, a laser beam emitted from a semiconductor laser and having a wave length of 850 nm was condensed through an optical system to the transfer section to form a spot of 6×10 μm on the transfer section. Laser pulses of "1 ms ON" and "1 ms OFF" at 20 mW were applied to the transfer section, and at the same time the recording paper was scanned to form a line image thereon. As a result, there was obtained a magenta line image having a width of about 80 μm and an optical density (OD; measured by Mcbeth reflection densitometer) of about 0.4.

in addition, after one million laser pulses were applied, the thermal print head was removed from the printer and then washed to remove a residual dye. The transfer section of the treated print head was observed by a microscope. It was confirmed that no trace of burnt deposits was present.

Example 2

The procedure of Example 1 was repeated in the same manner as described above except that the dye No. 4 of Table 1A having a melting point of 96° C. to 97° C. was used instead of the dye No. 1. As a result, it was confirmed that no trace of burnt deposits was present even after application of one million laser pulses.

Example 3

The procedure of Example 1 was repeated in the same manner as described above except that the dye No. 9 of Table 1A having a melting point of 109° C. to 110° C. was used instead of the dye No. 1 and the print head was heated to 120° C. As a result, it was confirmed that no trace of burnt deposits was present even after application of one million laser pulses.

Example 4

The procedure of Example 1 was repeated in the same manner as described above except that the dye No. 32 of Table 1C having a melting point of 112° C. to 113° C. was used instead of the dye No. 1 and the print head was heated to 120° C. As a result, it was confirmed that no trace of burnt deposits was present even after application of one million laser pulses.

Example 5

The dye No. 1 of Table 1A was dissolved in dimethyl phthalate to prepare a recording liquid having a dye concentration of 15% by weight. The thus-prepared recording liquid was filled into the transfer print head at a normal temperature. Subsequent procedure was performed in the same manner as in Example 1. As a result, there was obtained a line image having a width of 80 μm and an optical density (OD) of about 0.1. Further, it was confirmed that no trace of burnt deposits was present even after application of one million laser pulses.

Comparative Example 1

The procedure of Example 1 was repeated in the same manner as described above except the dye having a melting point of 123° C. to 124° C. and represented by the following general formula was used instead of the dye No. 1.

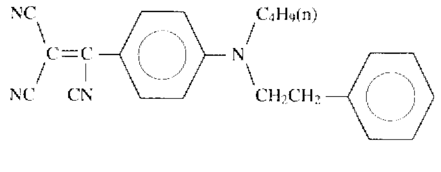

As a result, when the number of applied laser pulses exceeded about 100,000, an amount of the recording liquid transferred was reduced so that a concentration of the printed line image started to be decreased. When the number of applied laser pulses reached 200,000, it was impossible to continue the transfer printing operation. The print head was removed from the printer and washed to remove the residual dye. The print head was observed by using a microscope so that it was confirmed that burnt deposits were generated on a head portion of the fine column-shaped members.

Comparative Example 2

The procedure of Example 5 was repeated in the same manner as described above except the dye used in the above Comparative Example 1 was used instead of the dye No. 1 of Table 1A. As a result, when the number of applied laser pulses exceeded about 100,000, an amount of the recording liquid transferred was reduced so that a concentration of the printed line image started to be decreased. When the number of applied laser pulses reached 200,000, it was impossible to continue the transfer printing operation. The print head was removed from the printer and washed to remove the residual dye. The print head was observed by using a microscope so that it was confirmed that burnt deposits were attached on a head portion of the fine column-shaped members.

Although the present invention is described with respect to the preferred embodiments, it will be apparently understood that the present invention is not intended to be limited to those particular embodiments and that various changes and modifications could be effected without departing from the spirit or scope of the invention.

For instance, in addition to the full-color printing in which the dyes of three primary colors including magenta, yellow and cyan, and further black dyes are used, a two-color printing or a mono-color printing can be performed.

The dyes, the solvent and other ingredients can be used singly or in the form of a mixture composed of different compounds.

The porous structure formed in the transfer section (heater section or vaporizing section) is not limited to those described above. For example, the height, a top plan or sectional surface shape or a density of the column-shaped members can be variously changed depending upon the requirements. The porous structure may be used in any portions where fine pattern formation, porosity or expansion of the surface area is required. The porous structure may be in the form of beads, fibers in addition to column-shaped members or walls.

The heat energy for heating the recording liquid may be supplied by heating beams other than the laser beam, or otherwise the heating may be performed by other heating system such as a resistance heat. To this end, it is preferred that a conductive material is added to the recording liquid. Further, an adequate heating method can be used to obtain a good concentration gradation of the printed image.

Moreover, the number of the storage cavities for the recording material (dye), the number of dots and the number of beams emitted from the laser array (number of illuminating points) can vary depending upon the requirements. The arrangement or size thereof are not limited to those described above.

In the embodiments described above, the printer and the print head performs the heating of the recording liquid by using the laser or the heating element, a combination thereof can be also used in the present invention. In this case, the same heating effect can be obtained by low power of these heating means.

In addition, a configuration or a shape of the printer or the print head, and a material for respective elements of the print head may be selected adequately.

Further, the recording material usable in the present invention may be a liquid dye prepared from a solid dye, which is converted into droplets in the transfer section of the print head. Alternatively, a dye showing a liquid state at room temperature can be stored in the dye storage cavity. The printing paper may be disposed below the print head and irradiated with a laser beam emitted from above the print head.

As described above, according to the present invention, the recording material containing the dye of the aforementioned general formula (I), shows a sufficient heat resistance, so that no kogation due to decomposition products occurs, whereby a porous structure of the transfer section in the print head and its effect can be maintained even when subjected to repeated recording operations.

In this case, the porous structure is effective to produce a large number of fine droplets. Further, the number of droplets can be freely controlled in response to a heating energy to be applied to the transfer (heater) section corresponding to information data entered. This enables a multi-valued concentration gradation which results in obtaining a printed image (for example, a full-colored image) having an image quality identical to or higher than that by a silver salt-type recording system. In addition, the recording system of the present invention is of a thermal transfer type, so that compactness of the printer, ease of maintenance, prompt printing operation, and high quality and high gradation of printed images can be achieved.

What is claimed is:

1. A thermal transfer recording material for use in a recording apparatus in which said thermal transfer recording material is introduced into a transfer section having a porous structure by an effect of capillarity, subjected to a state transformation such as vaporization or droplet formation by heating, and then transferred to a recording medium disposed opposed to said transfer section, comprising:

a dye having a melting point of 115° C. or lower and represented by the general formula (I):

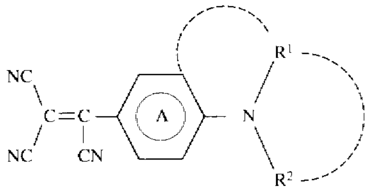

(I)

where A is a substituted or unsubstituted p-phenylene group, $R^1$ and $R^2$ are individually a hydrogen atom, a substituted or unsubstituted alkyl or alkenyl group, a cycloalkyl group or a substituted or unsubstituted phenyl group; and $R^1$ may constitute a heterocyclic group composed of a five- or six-member ring in combination with the p-phenylne group A and a nitrogen atom adjacent to said p-phenylene group A, or another heterocyclic group composed of a five- or six-member ring in combination with $R^2$ and the nitrogen atom adjacent to the p-phenylene group A.

2. The thermal transfer recording material according to claim 1, wherein said p-phenylene group A contains a substituent group selected from the group consisting of a linear branched alkyl or alkoxy group having 1 to 4 carbon atoms, a halogen atom and a flouroalkyl group having 1 to 4 carbon atoms.

3. The thermal transfer recording material according to claim 1, wherein said $R^1$ and $R^2$ are individually a linear or branched, substituted or unsubstituted alkyl or alkenyl group having 1 to 12 carbon atoms; a cycloalkylgroup having 5 or 6 carbon atoms; or a phenyl group having a substituent group selected from the group consisting of a linear or branched alkyl or alkoxy group having 1 to 8 carbon atoms, a halogen atom or a fluoroalkyl group having 1 to 4 carbon atoms.

4. The thermal transfer recording material according to claim 1, wherein $R^1$ and $R^2$ are individually a linear or branched alkyl or alkenyl group having 1 to 8 carbon atoms; a linear or branched alkyl or alkenyl group with 1 to 4 carbon atoms having a substituent group selected from the group consisting of a linear or branched alkoxy group having 1 to 4 carbon atoms, a phenyl group, a phenoxy group or an allyloxy group; and a heterocyclic group-substituted alkyl group.

5. The thermal transfer recording material according to claim 1, wherein, when the radical $R^1$ forms a heterocyclic group in combination with the p-phenylene group A and the nitrogen atom adjacent to said phenylene group A, said dye is represented by the general formulae (II) or (III):

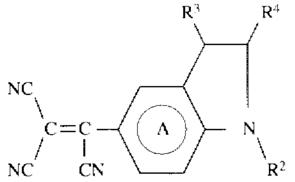

(II)

where A and $R^2$ have the same meaning as defined in the general formula (I), and $R^3$ and $R^4$ are individually a hydrogen atom or an alkyl group:

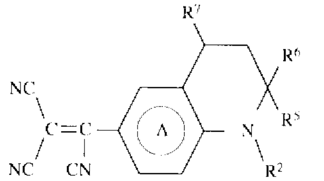

(III)

where A and $R^2$ have the same meaning as defined in the general formula (I), and $R^5$, $R^6$ and $R^7$ are individually a hydrogen atom or an alkyl group.

6. The thermal transfer recording material according to claim 1, wherein said heterocyclic group formed by the radicals $R^1$ in combination with $R^2$ and the nitrogen atom adjacent to said phenylene group A, is selected from the group consisting of

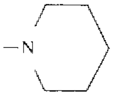, 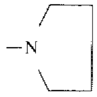, 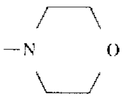 or 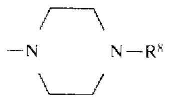

where $R^8$ represents an alkyl group.

7. The thermal transfer recording material according to claim 1, wherein said dye represented by the general formula (I) has a melting point of 100° C. or lower.

8. The thermal transfer recording material according to claim 1, wherein said recording material is in a liquid state and converted into a gaseous material or a mist having a size not more than 1 μm upon heating, said gaseous material or mist being transferred to said recording medium through a gap of 10 μm to 300 μm.

9. The thermal transfer recording material according to claim 1, wherein said porous structure has a side length or a diameter of 0.2 to 3 μm and a height of 1 to 15 μm.

10. The thermal transfer recording material according to claim 9, wherein said porous structure is composed of a plurality of fine column-shaped members each having a side length or a diameter of 0.5 to 3 μm and a height of 1 to 15 μm, said column-shaped members being arranged in three or more columns and three or more rows at intervals of 0.5 to 3 μm.

11. The thermal transfer recording material according to claim 1, wherein said recording material is colorless and has a molecular weight not more than 450, a melting point not higher than 50° C. and a boiling point ranging from 150° C. to 400° C., and composed of a solution containing 5% by weight or more of the dye of the general formula (I) in a solvent at 50° C. or lower, said solvent generating a residue in an amount of 0.01% by weight or less when heated to 200° C. in air.

12. The thermal transfer recording material according to claim 11, wherein said solvent is an aromatic ester and/or an aromatic hydrocarbon.

13. The thermal transfer recording material according to claim 12, wherein said aromatic ester is dialkyl phthalate.

14. A thermal transfer recording method used in operation of a recording apparatus including a transfer section composed of a plurality of fine porous column-shaped members, comprising the steps of:

introducing, into said transfer section by capillarity, a thermal transfer recording material containing a dye having a melting point of 115° C. or lower and represented by the general formula (I):

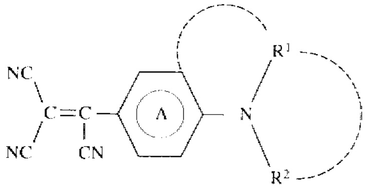

(I)

where A is a substituted or unsubstituted p-phenylene group, $R^1$ and $R^2$ are individually a hydrogen atom, a substituted or unsubstituted alkyl or alkenyl group, a cycloalkyl group or a substituted or unsubstituted phenyl group; and $R^1$ may constitute a heterocyclic group composed of a five- or six-member ring in combination with said p-phenylene group A and a nitrogen atom adjacent to said p-phenylene group A, or another heterocyclic group composed of a five- or six-member ring in combination with $R^2$ and the nitrogen atom adjacent to said p-phenylene group A;

subjecting said thermal transfer recording material to a state transformation by heating; and transferring said thermal transfer recording material to a recording medium disposed opposed to said transfer section.

* * * * *